3,393,938
HEADREST

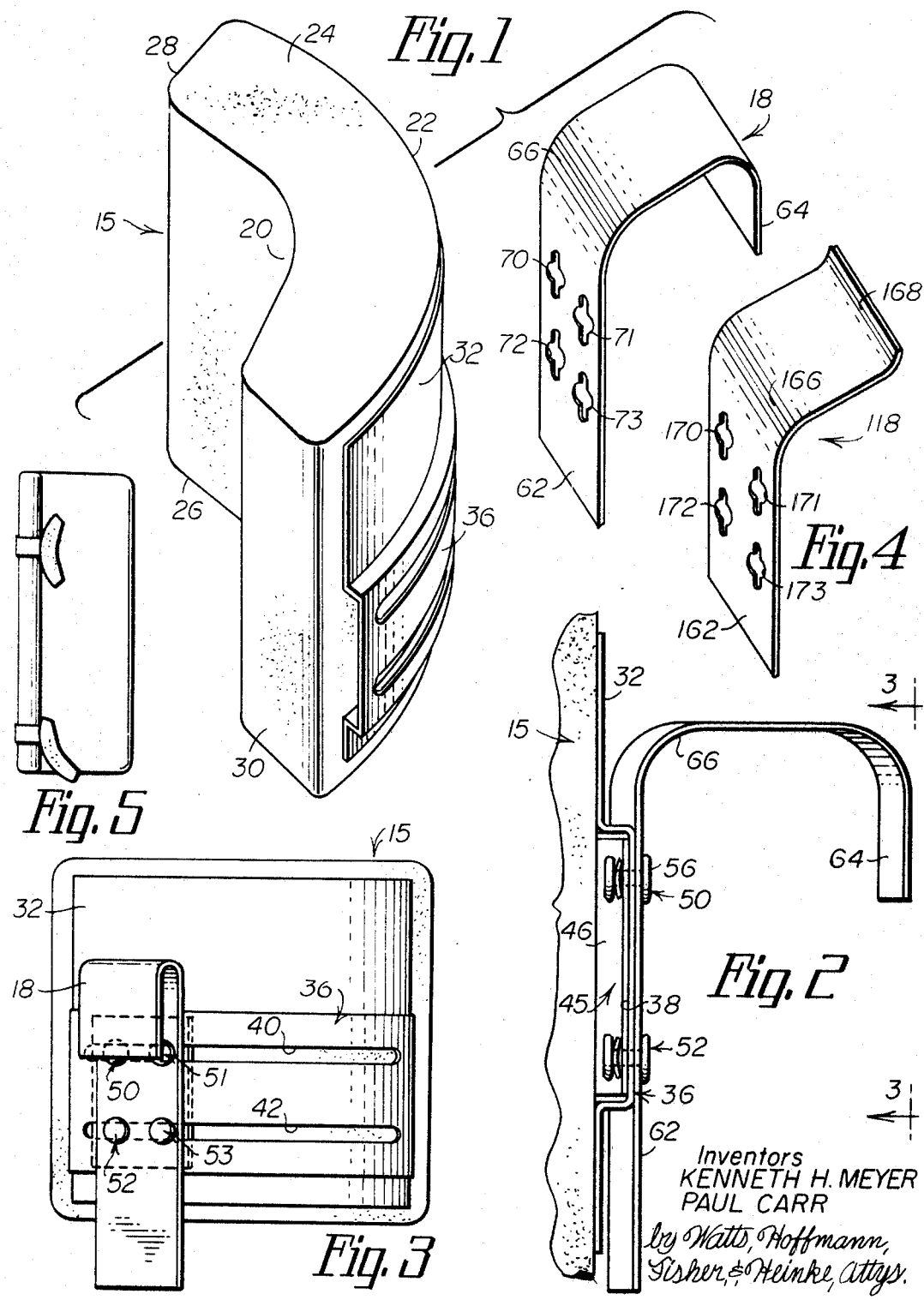

Kenneth H. Meyer, 1375 N. Revere Road, Akron, Ohio 44313, and Paul Carr, 1910 Graybill Road, Uniontown, Ohio 44685
Filed Oct. 11, 1966, Ser. No. 585,797
9 Claims. (Cl. 297—397)

ABSTRACT OF THE DISCLOSURE

An adjustable headrest including a curved pillow and a mounting bracket that fits over the upper edge of the backrest of a seat. A support plate on the back of the pillow has slots that interconnect the pillow to the mounting bracket and permit angular adjustment and adjustment in height of the pillow.

---

This invention relates to a headrest, and more particularly to an adjustable headrest adapted to be secured over the backrest of an auto seat.

Seats, such as those used in most automobiles and trucks and in many other vehicles, are typically constructed with a backrest that terminates adjacent the shoulders of a person sitting in the seat. This is satisfactory when the seat is used for a short time, as in a short trip by automobile, but a person confined to the seat for a long time usually becomes uncomfortable and tired.

One of the principal reasons for the discomfort associated with such seats is the lack of support for the head, neck and upper shoulders. On long trips it is not uncommon for passengers to use small pillows or spare articles of clothing to improvise a suitable headrest. For example, a pillow might be wedged into the corner between the upper backrest of the seat and the inside wall of the vehicle. It is usually not long before the pillow slips from place. Moreover, location of the improvised headrest cannot be satisfactorily varied.

Various headrests have been proposed for many specific uses, but none of those proposed for vehicles has been fully satisfactory. Perhaps one reason is that an acceptable headrest must provide firm support, be adjustable as to position and height, be universally adaptable to the different seat construction in use, be convenient to use, attractive, and low in cost. In accordance with the present invention, a headrest having these and other features has been provided.

The headrest of this invention conveniently clips over the top and front surface of the backrest of any standard automobile seat and can also be used with truck, bus and airplane seats. This is achieved with a mounting bracket that fits over the upper edge of the backrest of the seat. The bracket can be bent if necessary to accommodate different backrests and can be positioned at any location along the upper edge of the seat.

A curved pillow is secured to the bracket in a manner that provides for vertical adjustment. In one position of adjustment the pillow extends substantially above the upper edge of the backrest. In another position it is located essentially below the upper edge. The pillow is preformed in an arc to fit the head or the head and upper shoulders. In the preferred embodiment, the pillow is curved generally cylindrically about an axis that is upright when the pillow is secured to a backrest. Preferably the pillow is curved through an arc of about 90 degrees.

A curved support plate is attached to the back of the pillow. Slots extend along the curved support plate and fasteners, such as rivets or bolts, extend through the slots to the mounting bracket on the backrest of the seat. By sliding the curved pillow and support plate relative to the bracket, the rivets slide along the slots and the pillow is rotated about the cylindrical axis of its curvature to change the angular relationship of the pillow with respect to the seat.

The pillow and bracket construction permit the pillow to be located in many positions. For example, the pillow may be placed at either end or centrally of the top edge of the backrest. With the bracket located centrally behind the pillow and positioned at the center of the backrest of the seat, the pillow provides firm centered, support for the head of a person sitting upright in the seat. With the bracket located at one extreme end of the curved pillow and hooked over the backrest of the seat adjacent a side edge of the backrest, the pillow faces diagonally across the seat to form a corner headrest firmly secured to the backrest of the seat. The bracket and pillow are so constructed and arranged that the pillow is positioned forwardly of the backrest to support the head in a natural, comfortable position.

The support plate and slots behind the curved pillow are constructed and arranged so that the grooves are closer to one of the upper and lower edges of the pillow than they are to the other. Depending upon the way the pillow is oriented, the distance it extends above the bracket will vary. Normally, the pillow provides best support for grown-ups when it extends above the backrest of an automobile seat. In the case of a young person whose head and shoulders do not extend above the upper edge of the backrest, the pillow may be detached from the bracket turned over, and reattached so that the portion of the pillow extending the greatest distance from the groove extends downward to accommodate the smaller person. This may also be most suitable for seats with high backrests, as are sometimes found in buses and airplanes.

The pillow of this invention is provided with means for connecting the pillow to the bracket for relative movement and for easy detachment. This not only facilitates the sliding adjustment and the vertical adjustment already mentioned, but also facilitates the use of different types of supporting brackets. For example, an inverted U-shaped bracket is satisfactory for the front seat of an automobile but not for the back seat if the automobile has an overhanging rear ledge. With the attachment construction provided, a different bracket may be easily substituted to accommodate different seats.

While the attachment means is constructed to provide both the vertical and horizontal adjustment, it positively prevents pivotal adjustment of the pillow relative to the mounting bracket. Thus, a firm, safe, head support is provided that will maintain a preadjusted position even though subjected to the forces associated with moving vehicles.

These and other features and advantages of this invention will become more apparent as the same become better understood by reference to the following detailed description when considered in connection with the accompanying drawings, in which:

FIGURE 1 is an expanded perspective view of a preferred embodiment of a headrest showing a pillow and bracket constructed in accordance with the present invention;

FIGURE 2 is a partial side elevational view of the headrest of FIGURE 1 in assembled condition, showing on an enlarged scale the connection between the pillow and mounting bracket;

FIGURE 3 is a back elevational view of the headrest of FIGURE 1 in assembled condition, illustrating further details of the mounting bracket and pillow support plate;

FIGURE 4 is a perspective view of a modified mounting bracket adapted particularly for use on the backrest of a back seat of an automobile having an overhanging rear ledge; and FIGURE 5 is a diagrammatic top plan view of an automobile seat showing two headrests mounted in different positions.

As shown in the drawings, the headrest includes a curved pillow 16 that is adjustably attached to a U-shaped bracket 18 adapted to fit over the upper edge of the backrest of a seat. The curved pillow 16 is preformed with a curved front surface 20, a curved back surface 22 and relatively flat top and bottom surfaces 24, 16, respectively. Side ends or edges 28 and 30 are essentially straight in the embodiment shown and are spaced from each other through an arc of approximately 90 degrees. Thus, the preferred shape is essentially a section of a cylinder, although other shapes are also suitable. The preformed pillow 16 may be fabricated in any conventional manner, for example, it may be formed of a soft foam rubber material and covered with fabric.

A supporting plate 32 is attached to the back surface 22 of the curved pillow 16 to connect the pillow with the bracket 18 for relative sliding adjustment. The supporting plate 32 is cylindrically curved to conform with the curvature of the back surface 22 of the pillow 16. The plate 32 extends substantially the length and height of the back surface 22. A horizontal channel 36 is formed in the plate 32. The channel extends around the back of the pillow, providing a plate portion 38 spaced from the back surface 22. The channel 36 is located closer to the bottom surface 26 of the pillow than it is to the top surface 24, in the orientation of the pillow in the drawings.

Two spaced slots 40, 42 are formed in the spaced portion 38 of the channel 36. The slots are closed at each end and extend parallel to each other substantially the length of the channel. This provides a range of relative sliding adjustment between the pillow 16 and the bracket 18.

An attachment assembly 45 (FIGURES 2 and 3) is associated with the channel and slots 40, 42 to detachably mount the supporting plate 32 and pillow 16 to the bracket 18. The attachment assembly 45 includes a slider plate 46 that is rectangular in shape and curved to the radius of the spaced portion 38 of the channel 36. Four spaced holes 48 are formed in the plate 46, arranged in upper and lower pairs that are vertically spaced the distance between the slots 40, 42, aligning them with the slots 40, 42. Four fastening means, such as tubular rivets 50, 51, 52, 53 extend through the four holes 48 of the slider plate 46. The rivets each include an enlarged preformed head portion 56, a tubular shank portion 58 and a peened head portion 60. The shank portion 58 of each rivet extends through the slider plate 46 and associated groove 40 or 42 of channel 36. The enlarged preformed head 56 is positioned on the outside of the spaced channel portion 38 of the supporting plate and the peened head 60 is located adjacent the inside surface of the slider plate 46. A resilient biasing means, such as a belleville washer 61 surrounds each shank 58 between the peened head 60 and the inside surface of the slider plate 46. This resiliently biases the preformed head 56 of each rivet inward toward the chanel 36.

The bracket 18 is constructed to rest on the front and top surfaces of the backrest of a seat and to support the pillow 16 through the attachment assembly 45. In the embodiment shown in FIGURE 1, the bracket 18 is constructed of a strip of sheet metal formed in an inverted U-shape having a long front leg 62 and a short back leg 64 spaced by a transverse portion 66. The longer leg 62 is adapted to rest over the front surface of the backrest of a seat and contains four apertures 70, 71, 72, 73. Each aperture is formed of a slot 75 of a width slightly greater than the diameter of the shank portion 58 of the rivets 50–53. An enlarged opening 76 slightly larger than the diameter of the preformed head 56 of each rivet is located at the middle of each slot 75. The apertures 70–73 are spaced to correlate with the four spaced holes 48 of the slider plate 46 to receive the four rivets 50–53, thereby securing the supporting plate 32 to the bracket 18.

A second embodiment of a mounting bracket 118 is shown in FIGURE 4 of the drawings. The bracket 118 includes a front leg 162 similar to the leg 62 of the previous embodiment. Apertures 170, 171, 172, 173 are provided in the leg 162 to receive the rivets of the attachment assembly 45. A transverse portion 166 extends from the top of the leg 162 and terminates in an upwardly curved portion 168. This bracket is useful for mounting the pillow 16 on the backrest of the rear seat of an automobile that has an overhanging rear ledge. The transverse portion 166 extends over the top of the backrest and the upwardly curved terminal portion 168 slides beneath the overhanging rear ledge, between the seat and the ledge to secure the bracket in place at the top of the backrest.

Examples of typical adjustments and locations of the headrest in an automobile are shown in FIGURE 5 of the drawings. Relative adjustment of the pillow 16 with respect to the bracket 18 facilitates the different locations and positions shown. With the bracket 18 at its extreme position of adjustment, such as adjacent the side edge 30, the pillow can be supported on the bracket of an automobile seat 80 (see FIGURE 5) to provide a corner headrest. Even though the pillow may be adjacent a door of the automobile, it is supported by the backrest of the seat, and therefore provides a safe and secure headrest. With the bracket 18 moved to the other extreme of the adjustment range, the headrest can be positioned as a corner pillow on the other side of the automobile. With the bracket 18 positioned centrally of the pillow, as also shown in FIGURE 5, the pillow provides a headrest for a passenger facing straight ahead.

When it is desired to detach the pillow 16 from the bracket 18, for example, when it is desired to invert the pillow to provide a lower head support or when it is desired to change the bracket 18 for the bracket 118, the pillow is moved vertically relative to the bracket 18. Casual movement of this type during use is resisted by the clamping force of the rivet heads 56, as provided by the stressed belleville washers 61. However, this clamping force does not prevent purposeful movement of the pillow relative to the bracket to slide the rivet heads 56 into alignment with the enlarged openings 76 of the apertures 70–73. This releases the connection between the rivets and the slot portion 75, and the pillow is free from the bracket. The pillow is then inverted or the replacement bracket is obtained and the pillow is reattached. To connect the rivets 50–53 with the respective apertures 70–73, pressure is applied to the peened heads 60 of the rivets to cause the preformed heads 56 to extend away from the cushion supporting plate 32. This may be easily done with the bracket 18 removed from the backrest. The leg 62 is placed adjacent the attachment assembly 45 and a finger is inserted through one of the grooves 40, 42 on each side of the leg 62 and slider plate 46 to press the bottom of the two rivets in that slot outward, away from the channel 36. The rivets then easily extend into the enlarged openings 76 of the adjacent apertures and attach the pillow to the bracket. The same thing is done with the rivets in the other groove.

Once the pillow is attached to the bracket 18, the friction of the slider plate 46 with the channel portion 38 holds the pillow 16 in predisposed relationship with the bracket 18. The pillow can nevertheless be adjusted by purposefully pushing the pillow sideways to overcome the friction and clamping force of the belleville washers. The pillow and supporting plate then slide relative to the bracket 18 in the direction of the slots 40, 42. Because the slots extend about the major portion of the back surface of the pillow, a relatively wide adjustment range is provided. In the embodiment shown, an adjustment range of approximately 78 degrees is provided. Once positive and purposeful force causing relative sliding between the bracket and the pillow is removed, the gripping force of the slider plate and rivets maintains the relationship between the bracket and the pillow.

With this invention, a headrest is provided that is not only adaptable to a variety of conventional seat backrests by virtue of the mounting bracket construction, but also a contoured pillow is provided that facilitates a wide range of angular adjustments and a choice of vertical positions. This is achieved while yet maintaining the construction compact, simple, and inexpensive.

While a preferred embodiment of the invention has been described in detail and with particularity, it will be apparent that various alterations and modifications may be made therein without departing from the spirit and scope of the invention, as set forth in the appended claims.

What is claimed is:

1. A headrest comprising a pillow having curved upper and lower edges and curved front and back surfaces, a supporting plate attached to the pillow, curved in part to conform with the curvature of the back surface of the pillow and having a portion spaced from the back surface of the pillow and extending along the pillow curvature, two parallel slots in the spaced portion of the supporting plate extending along the plate curvature, a bracket constructed and arranged to rest on front and top surfaces of a backrest of a seat, said bracket including spaced apertures in the portion constructed and arranged to rest on the front surface of a backrest of a seat, the apertures being constructed and arranged so that they can be opposite each parallel slot in the supporting plate, and means interconnecting the supporting plate and the bracket, said means including a slider plate between the spaced portion of the supporting plate and the pillow, and connectors extending through the slots and engaged with the slider plate and with the bracket through the spaced apertures of the bracket.

2. A headrest comprising a curved pillow having top and bottom portions and a concave front surface and a convex back surface, a curved supporting plate attached to the pillow and extending about the back surface thereof and having a portion spaced from the back surface, a slot extending along the curved support plate in the portions spaced from the back surface of the pillow, said slot being located closer to one of the top and bottom portions of the pillow than to the other, a bracket constructed and arranged to rest on front and top surfaces of a backrest of a seat, and means interconnecting the supporting plate and the bracket through said slot.

3. A headrest comprising a curved pillow having a concave front surface and a convex back surface, a curved supporting plate attached to the pillow and extending about the back surface thereof and having a portion spaced from the back surface, first and second parallel slots extending along the curved supporting plate in the portion spaced from the back surface of the pillow and curved in a single plane, a bracket constructed and arranged to rest on front and top surfaces of a backrest of a seat, and means interconnecting the supporting plate and the bracket through said slots.

4. A headrest comprising a curved pillow having a concave front surface and a convex back surface, a curved supporting plate attached to the pillow and extending about the back surface thereof and having a portion spaced from the back surface, a slot extending along the curved supporting plate in the portion spaced from the back surface of the pillow, a bracket constructed and arranged to rest on front and top surfaces of a backrest of a seat, and means interconnecting the supporting plate and the bracket through said slot, said interconnecting means including at least two fasteners connected to the bracket and engaged with the slot of the supporting plate.

5. The headrest of claim 1 wherein the connectors are carried by the slider plate for relative movement and have enlarged head portions extending from the slider plate, and a resilient means is operatively associated with the connectors and slider plate to resiliently bias the head portions of the connectors toward the slider plate while permitting the head portions to be moved in a direction away from the slider plate against the biasing force of the resilient means; and wherein the apertures of the bracket include enlarged portions and narrow portions to receive the heads of the connectors and secure the pillow to the bracket for sliding adjustment.

6. The headrest of claim 4 wherein the fasteners are carried by the slot in slidable relationship and include an enlarged head portion extending from the slot, and wherein the bracket includes two spaced slots narrower than the head portion of the fasteners, each slot including an enlarged opening larger than the head portions of the fasteners to receive the head portion of a fastener to secure the pillow to the bracket.

7. The headrest of claim 6 including a plate between the back surface of the pillow and the spaced portion of the supporting plate to connect and support the spaced fasteners, said plate being constructed and arranged to slide relative to the pillow and supporting plate.

8. The headrest of claim 4 wherein the fasteners are carried by the slot in slidable relationship and each fastener includes an enlarged head portion extending from the slot, and resilient means carried by the fasteners between the spaced portion of the supporting plate and the pillow to bias the extending head portions toward the supporting plate.

9. The headrest of claim 3 wherein the means interconnecting the supporting plate and the bracket include at least two fasteners connected to the bracket with at least one fasener engaged with each of the two slots of the supporting plate.

References Cited

UNITED STATES PATENTS

| | | | |
|---|---|---|---|
| 937,343 | 10/1909 | Wallace | 297—407 |
| 1,257,427 | 2/1918 | Underwood | 297—407 |
| 2,573,186 | 10/1951 | De Mier | 297—399 |
| 2,827,110 | 3/1958 | Rising | 297—399 |
| 2,897,878 | 8/1959 | Mungoran | 297—399 |

CASMIR A. NUNBERG, *Primary Examiner.*